United States Patent [19]

Baumgartner et al.

[11] Patent Number: 5,434,218
[45] Date of Patent: Jul. 18, 1995

[54] ABS MOLDING MATERIALS HAVING A BIMODAL RUBBER PARTICLE SIZE DISTRIBUTION

[75] Inventors: Ehrenfried Baumgartner, Roedersheim-Gronau; Juergen Hofmann, Ludwigshafen; Rudolf H. Jung, Worms; Rainer Moors, Limburgerhof; Hansjoerg Schaech, Ludwigshafen, all of Germany

[73] Assignee: BASF Aktiengesellschaft, Ludwigshafen, Germany

[21] Appl. No.: 225,928

[22] Filed: Apr. 11, 1994

Related U.S. Application Data

[63] Continuation of Ser. No. 970,961, Nov. 3, 1992, abandoned, which is a continuation of Ser. No. 854,385, Mar. 19, 1992, abandoned.

[30] Foreign Application Priority Data

Mar. 30, 1991 [DE] Germany .................. 41 10 459.5

[51] Int. Cl.$^6$ .................. C08L 25/12; C08L 55/02
[52] U.S. Cl. .................. 525/71; 525/70; 525/83; 525/84; 525/232; 525/234; 525/238; 525/241
[58] Field of Search .................. 525/70, 71, 83, 84, 525/232, 234, 238, 241

[56] References Cited

U.S. PATENT DOCUMENTS 3,928,494 12/1975 Aliberti .................. 260/876 R
4,250,271 2/1981 Morris et al. .................. 525/712

FOREIGN PATENT DOCUMENTS 103657 1/1986 European Pat. Off. .
190884 1/1986 European Pat. Off. .
0412801 2/1991 European Pat. Off. .
0474618 3/1992 European Pat. Off. .
1745098 10/1974 Germany .
1900134 11/1978 Germany .

*Primary Examiner*—W. Robinson Clark
*Attorney, Agent, or Firm*—Keil & Weinkauf

[57] ABSTRACT

Rubber-modified, impact-resistant molding materials contain, based on the sum of A, B1 and B2, A: from 70 to 98% by weight of a polymer matrix A formed by free radical polymerization of a mixture of from 60 to 90% by weight of styrene and from 10 to 40% by weight of acrylonitrile, B1: from 1 to 29% by weight of a particulate, first graft copolymer B1 which is distributed in the matrix A and consists of a grafting base of polybutadiene and grafts of a copolymer of styrene and acrylonitrile having a mean particle size of about 100–500 nm, and B2: from 1 to 29% by weight of a particulate, second graft copolymer B2 distributed in the matrix A and consisting of a grafting base of polybutadiene and grafts of a copolymer of styrene and acrylonitrile having a mean particle size of from 600 to 10,000 nm, as obtained if both graft copolymers have been prepared by solution and/or mass polymerization and have been incorporated in the polymer matrix in a conventional manner.

1 Claim, No Drawings

ABS MOLDING MATERIALS HAVING A BIMODAL RUBBER PARTICLE SIZE DISTRIBUTION

This application is a continuation of application Ser. No. 07/970,961, filed Nov. 3, 1992, which is a continuation of application Ser. No. 07/854,385, filed on Mar. 19, 1992, both now abandoned.

The present invention relates to an ABS molding material which has a bimodal distribution of the rubber particle size and whose rubber phases are prepared exclusively by solution or bulk polymerization.

ABS molding materials having a bimodal rubber particle size distribution are known. As a rule, one or more rubber phases are prepared by emulsion polymerization, this being described, inter alia, in the publications below.

| | |
|---|---|
| (1) DE-A-1 745 098 | (7) US-A-4 740 560 |
| (2) DE-A-1 900 134 | (8) EP-A-0 190 884 |
| (3) US-A-3 903 199 | (9) US-A-3 243 481 |
| (4) US-A-3 903 200 | (10) US-A-4 252 911 |
| (5) US-Av3 931 356 | (11) EP-A- 103 657 |
| (6) US-A-4 713 420 | |

It is known that blends of grafted rubbers and styrene/acrylonitrile copolymers lead to molding materials which have desirable properties, in particular with regard to the toughness and the chemical resistance, but are readily moldable. By increasing the rubber contents, it is possible in general to increase the toughness, but increasing the rubber content generally leads to a deterioration in other properties, for example to a reduction in the gloss. In addition to the rubber concentration, the properties of ABS molding materials are effected in particular by the rubber morphology and the size of the rubber particles. Rubber particles having a mean diameter of more than 500 nm increase in particular the toughness of the products but at the same time reduce the surface gloss. Rubber particles having a diameter of less than 500 nm give highly glossy ABS products, but the latter are less tough than ABS products containing larger rubber particles, assuming the same rubber content in the molding materials.

The individual structure of the rubber particles influences the physical properties of the ABS molding materials in a similar manner. In general, there are two types of rubber particles: rubber particles polymerized by solution or mass polymerization and isolated by precipitation, and rubber particles polymerized by emulsion polymerization. These are referred to as SABS particles and as EABS particles, respectively; the preparation is described in publications (1) and (2), respectively.

The SABS particles described in (1) contain inclusions of the polymer matrix in the rubber and are usually formed and grafted by mass, mass/suspension or solution polymerization. These processes start from a preformed (base) rubber which is dissolved in the monomers and, if necessary, the solvent and then subjected to polymerization, the SABS particles forming during the phase inversion.

The rubber particles obtained in this manner are usually larger than 500 nm and reduce the surface gloss of the ABS molding materials (9–11).

The EABS particles stated in (2) are generally small solid rubber particles. Rubber particles having this structure are usually formed and grafted by the emulsion process. The rubber particles are prepared by polymerization of, for example, butadiene in an aqueous phase with the aid of suitable emulsifiers. The aqueous rubber latex is then grafted with the monomers which are also present in the matrix, it being thought that the physical entanglement of the grafts with the matrix polymers ensures good binding of the tough and hard phase, which is decisive for the toughness of the ABS molding materials. The rubber particles prepared in this manner generally have a particle diameter of less than 500 nm and give highly glossy surfaces in ABS moldings.

In order to obtain ABS moldings having advantageous properties with regard to toughness and surface gloss, various graft rubbers having different rubber particle sizes were therefore blended; this is described in many of the publications stated at the outset. It is striking that, in all known blends, one or more graft rubbers consist of EABS particles, prepared by emulsion polymerization. However, owing to the assistants required during the emulsion polymerization, ABS molding materials prepared by emulsion polymerization have a more pronounced natural color than the ABS products prepared by solution polymerization, so that even corresponding bimodal blends are more strongly colored than ABS products obtained only in solution.

It is an object of the present invention to provide ABS products having an advantageous ratio of toughness to gloss and having a pale natural color, as known for pure solution ABS.

The present invention relates directly to a rubber-modified, impact-resistant molding material containing, based on the sum of A, B1 and B2, A: from 70 to 98% by weight of a polymer matrix A formed by free radical polymerization of a mixture of from 60 to 90% by weight of styrene and from 10 to 40% by weight of acrylonitrile, B1: from 1 to 29% by weight of a particulate, first graft copolymer B1 which is distributed in the matrix A and consists of a drafting base of polybutadiene and grafts of a copolymer of styrene and acrylonitrile having a mean particle size of about 100–500 nm, and B2: from 1 to 29% by weight of a particulate, second graft copolymer B2 distributed in matrix A and consisting of a grafting base of polybutadiene and grafts of a copolymer of styrene and acrylonitrile having a mean particle size of from 600 to 10,000 nm, as obtained if both graft copolymers have been prepared by solution and/or by mass polymerization and have been incorporated in the polymer matrix in a conventional manner.

Solution ABS having rubber particles whose diameter is less than 50 nm can be obtained, for example, by carrying out the polymerization in a plurality of tube reactors connected in series and operating essentially without back-mixing, phase inversion occurring in one of the reactors. The reaction temperature up to phase inversion should be 90° C. or less, and accordingly readily decomposing free radical initiators (for example, tertbutyl peresters) should be used.

Details are given in the German Offenlegungsschrift 40 30 512, which is referred to instead of a detailed description.

The preparation of coarse-particled solution ABS having particle diameters of up to 10,000 nm is generally known and is described in, for example, the publications stated at the outset.

Further polymers which can be blended with the solution ABS polymers described above are, for example, polystyreneacrylonitrile and/or polymethyl methacrylate. Both polymers are likewise prepared by a solution or mass polymerization process. The polystyreneacrylonitrile has in general an acrylonitrile content of from 10 to 40% by weight. Polymethyl methacrylate or copolymers of methyl methacrylate with other acrylates up to an acrylate content of about 20% by weight may likewise be used.

The molding materials obtained by the novel process can be processed by the known methods for processing thermoplastics, for example by extrusion, injection molding, calendering, blow molding, compression molding or sintering; the molding materials prepared by the novel process are particularly preferably converted into moldings by injection molding.

The product properties stated in the Examples were measured as follows:

The median particle size $d_{50}$ of the soft component phase is determined by evaluating electron micrographs.

The surface gloss was measured using a Dr. Lange laboratory reflectometer according to DIN 67,530 on the lateral surfaces of injection molded test boxes. In contrast to DIN 67,530, the angle of measurement was set at 55.8°. The test boxes have a length of 11 cm, a width of 4.3 cm and a height of 5 cm and weigh about 26–27 g. The injection molding conditions for the production of the test boxes are described in the Examples.

The yellowness index was measured using 1 mm thick circular disks injection molded at 230° C. A DMC 25 colorimeter from Zeiss was used for the measurement. Daylight (standard source D 65; condition 1) was taken as the transmitter and the human eye (10 degree standard observer as condition 2) as the receiver.

The notched impact strength was measured, according to DIN 53,453, using moldings injection molded at 230° C.

The intrinsic viscosity of the polystyreneacrylonitrile matrix was measured, after separation of the rubber phase, as a 0.5% strength solution in dimethylformamide.

EXAMPLES 1–8

A product (G) having the following properties was used as a solution ABS having large rubber particles:

| | |
|---|---|
| Rubber particle size $d_{50}$ | 2.0 μm |
| Rubber content (Buna HX 500) | 17.0% by weight |
| Intrinsic viscosity of the PSAN matrix | 81.2 ml/g |
| Styrene content of the PSAN matrix | 75.0% by weight |
| Acrylonitrile content of the PSAN matrix | 25.0% by weight |
| Surface gloss (Condition 1) | 57% |
| Surface gloss (Condition 2) | 23% |

A product (F) which had been obtained according to Example 1 German Patent Application P 40 30 512.0 and had the following properties was used as a solution ABS having small rubber particles:

| | |
|---|---|
| Rubber particle size $d_{50}$ | 0.3 μm |
| Rubber content (Buna HX 500) | 17.0% by weight |
| Intrinsic viscosity of the PSAN matrix | 80.1 ml/g |
| Styrene content of the PSAN matrix | 75.0% by weight |
| Acrylonitrile content of the PSAN matrix | 25.0% by weight |
| Surface gloss (Condition 1) | 70% |
| Surface gloss (Condition 2) | 46% |

The two solution ABS products were mixed with one another in the form of granules in the stated weight ratio, extruded together and granulated as a blended product.

| Example | Product G [% by wt.] | Product F [% by wt.] | Surface gloss* Condition 1 [%] | Surface gloss* Condition 2 [%] | Yellowness index | Notched impact strength 23° C. [kJ/m²] | Notched impact strength −40° C. [kJ/m²] |
|---|---|---|---|---|---|---|---|
| 1 | 100 | — | 57 | 23 | 12.1 | 22 | 12 |
| 2 | — | 100 | 70 | 46 | 11.7 | 6 | 5 |
| 3 | 5 | 95 | 68 | 44 | 11.9 | 10 | 8 |
| 4 | 10 | 90 | 68 | 44 | 11.8 | 14 | 12 |
| 5 | 20 | 80 | 68 | 40 | 12.0 | 16 | 12 |
| 6 | 30 | 70 | 67 | 37 | 11.7 | 24 | 13 |
| 7 | 40 | 60 | 65 | 32 | 11.8 | 24 | 14 |
| Control Experiment | 50 | 50 | 64 | 27 | 12.0 | 24 | 14 |

*Surface gloss (Condition 1):
| | |
|---|---|
| Melt temperature | 255° C. |
| Mold surface temperature | 60° C. |
| Injection time | 0.14 sec |

*Surface gloss (Condition 2):
| | |
|---|---|
| Melt temperature | 255° C. |
| Mold surface temperature | 30° C. |
| Injection time | 0.7 sec |

The molding material obtained in the Control Experiment does not meet the requirements set for the surface gloss.

COMPARATIVE EXPERIMENTS 1–8

The product G was used as solution ABS having large rubber particles.

A product (E) which had the following properties was used as an emulsion ABS having small rubber particles:

| | |
|---|---|
| Rubber particle size $d_{50}$ | 0.3 μm |
| Rubber content (polybutadiene) | 17.0% by weight |
| Intrinsic viscosity of the PSAN matrix | 80.7 ml/g |
| Styrene content of the PSAN matrix | 75.0% by weight |
| Acrylonitrile content of the PSAN matrix | 25.0% by weight |
| Surface gloss (Condition 1) | 68% |

-continued

| Surface gloss (Condition 2) | 47% |
|---|---|

It was prepared as follows: A polybutadiene latex was prepared at 25° C. by polymerizing 62 parts of butadiene in the presence of a solution of 0.6 part of tert-dodecyl mercaptan, 0.7 part of a sodium $C_{14}$-alkylsulfonate as an emulsifier, 0.2 part of potassium peroxodisulfate and 0.2 part of sodium pyrophosphate in 80 parts of water. The conversion was 99%. A polybutadiene whose mean particle size was 100 nm was obtained. The resulting latex was agglomerated with a solids content of 10% by weight by adding 25 parts of an emulsion of a copolymer of 96 parts of methyl acrylate and 4 parts of methacrylamide, a mean particle size of 300 nm being obtained. After the addition of 40 parts of water, 0.4 part of a sodium $C_{14}$-alkylsulfonate and 0.2 part of potassium peroxodisulfate, 38 parts of a mixture of styrene and acrylonitrile in a ratio of 70:30 were introduced in the course of 4 hours and polymerization was carried out at 75° C. The conversion, based on styrene/acrylonitrile, was virtually quantitative. The resulting graft rubber dispersion was precipitated by means of calcium chloride solution and washed with distilled water. The still moist product was blended with polystyrene-acrylonitrile (intrinsic viscosity=80.7 l/g; acrylonitrile content=25% by weight) in a twin-screw extruder with devolatilization at 280° C. so that the resulting ABS contained 17% by weight of polybutadiene.

Solution ABS product G was mixed with the emulsion ABS product E in the form of granules in the stated weight ratio, the mixture was melted in an extruder at 280° C., and the melt was mixed and granulated as a blended product. The properties of the resulting blends are summarized in the following Comparative Experiments:

| Comp. Experiment | Product G [% by wt.] | Product E [% by wt.] | Surface gloss* | | Yellowness index | Notched impact strength | |
|---|---|---|---|---|---|---|---|
| | | | Condition 1 [%] | Condition 2 [%] | | 23° C. [kJ/m²] | −40° C. [kJ/m²] |
| 1 | 100 | — | 57 | 23 | 12.1 | 22 | 12 |
| 2 | — | 100 | 68 | 47 | 32.8 | 11 | 4 |
| 3 | 5 | 95 | 68 | 43 | 29.3 | 11 | 3 |
| 4 | 10 | 90 | 68 | 44 | 28.7 | 12 | 5 |
| 5 | 20 | 80 | 68 | 40 | 25.3 | 16 | 9 |
| 6 | 30 | 70 | 66 | 36 | 23.8 | 21 | 11 |
| 7 | 40 | 60 | 64 | 33 | 20.7 | 23 | 13 |
| 8 | 50 | 50 | 64 | 28 | 20.4 | 24 | 14 |

*Surface gloss (Condition 1):
Melt temperature 255° C.
Mold surface temperature 60° C.
Injection time 0.14 sec
*Surface gloss (Condition 2):
Melt temperature 255° C.
Mold surface temperature 30° C.
Injection time 0.7 sec The products obtained in the Comparative Experiment have a deeper yellow color than the ABS products obtained in the novel Examples.

We claim:

1. A process for the preparation of a rubber-modified, impact-resistant molding material containing from 70 to 98% by weight of a polymer matrix A, from 1 to 29% by weight of a particulate, first graft copolymer B1, and from 1–29% by weight of a particulate, second graft copolymer B2, which process comprises (1) preparing component A by free radical polymerization of a mixture of 60 to 90% by weight of styrene and from 10 to 40% by weight of acrylonitrile; (2) preparing component B1, which consists of a grafting base of polybutadiene and grafts of a copolymer of styrene and acrylonitrile having a mean particulate size of about 100–500 nm, by solution polymerization; (3) preparing component B2, which consists of grafting base of polybutadiene and grafts of a copolymer of styrene and acrylonitrile, having a mean particulate size of from 600 to 10,000 nm, by solution polymerization; and (4) mixing components A, B1 and B2 in the form of granules and are melted together.

* * * * *